United States Patent
D'Anna et al.

(10) Patent No.: US 10,487,443 B1
(45) Date of Patent: Nov. 26, 2019

(54) HYBRID RF/CONVENTIONAL CLOTHES DRYER

(71) Applicant: LG Electronics Inc., Seoul (KR)

(72) Inventors: Pablo Eugenio D'Anna, Santa Barbara, CA (US); David S. Wisherd, Carmel, CA (US); Michael Andrew Wohl, Talbott, TN (US); Edward Herman Decker, Rogersville, TN (US); Gary Lynn Cox, Johnson City, TN (US)

(73) Assignees: Cool Dry, Inc., Santa Clara, CA (US); LG Electronics Inc., Seoul (KR)

( * ) Notice: Subject to any disclaimer, the term of this patent is extended or adjusted under 35 U.S.C. 154(b) by 112 days.

(21) Appl. No.: 15/652,077

(22) Filed: Jul. 17, 2017

Related U.S. Application Data

(63) Continuation-in-part of application No. PCT/US2015/058462, filed on Oct. 30, 2015.

(60) Provisional application No. 62/493,883, filed on Jul. 19, 2016.

(51) Int. Cl.
  *D06F 58/26* (2006.01)
  *F26B 3/34* (2006.01)
  *F26B 3/347* (2006.01)
  *D06F 58/28* (2006.01)

(52) U.S. Cl.
  CPC ............ *D06F 58/26* (2013.01); *F26B 3/343* (2013.01); *F26B 3/347* (2013.01); *D06F 2058/2816* (2013.01)

(58) Field of Classification Search
  CPC .. D06F 58/26; D06F 2058/2816; F26B 3/343; F26B 3/347

USPC .......................................................... 34/256
See application file for complete search history.

(56) References Cited

U.S. PATENT DOCUMENTS

| | | | |
|---|---|---|---|
| 2,472,193 A * | 6/1949 | Clayton | F26B 5/041 |
| | | | 159/12 |
| 2,511,839 A | 6/1950 | Frye | |
| 3,605,272 A | 9/1971 | Boucher | |
| 3,643,349 A | 2/1972 | Zenz | |
| 3,854,219 A | 12/1974 | Staats | |

(Continued)

FOREIGN PATENT DOCUMENTS

| | | | |
|---|---|---|---|
| DE | 10323494 A1 * | 12/2004 | ............. D06F 58/04 |
| EP | 0 862 218 A1 | 9/1998 | |

(Continued)

OTHER PUBLICATIONS

International Search Report (ISA/US) dated Sep. 15, 2011 for international patent application PCT/US2011/038594 filed May 31, 2011, 3 pages.

(Continued)

*Primary Examiner* — Stephen M Gravini
(74) *Attorney, Agent, or Firm* — Fish & Richardson P.C.

(57) ABSTRACT

The present invention encompasses methods and apparati for heating a load (9) such as clothes immersed in a medium (such as water) during a heating period. A method embodiment of the present invention comprises heating the load (9) and medium within an enclosure (10) by subjecting said load (9) and medium to heated air (104) originated from a conventional energy source (1); and applying heat to said load (9) and medium within the enclosure (10) via an AC electrical field, embodied as a capacitor, originated from an RF power source (2).

20 Claims, 11 Drawing Sheets

(56) References Cited

U.S. PATENT DOCUMENTS

| | | | |
|---|---|---|---|
| 3,866,255 A * | 2/1975 | Serota | D06C 7/00 219/773 |
| 3,938,260 A | 2/1976 | Brenner et al. | |
| 4,000,340 A | 12/1976 | Murphy et al. | |
| 4,126,563 A | 11/1978 | Barker | |
| 4,250,628 A | 2/1981 | Smith et al. | |
| 4,314,805 A | 2/1982 | McKnight | |
| 4,334,136 A | 6/1982 | Mahan et al. | |
| 4,356,640 A | 11/1982 | Jansson | |
| 4,490,923 A | 1/1985 | Thomas | |
| 5,152,075 A | 10/1992 | Bonar | |
| 5,463,821 A | 11/1995 | Gauer | |
| 5,712,469 A | 1/1998 | Chaffin et al. | |
| 5,869,817 A | 2/1999 | Zietlow et al. | |
| 5,983,520 A | 11/1999 | Kim et al. | |
| 6,124,624 A | 9/2000 | Van Roosmalen et al. | |
| 6,141,634 A | 10/2000 | Flint et al. | |
| 6,272,770 B1 | 8/2001 | Slutsky et al. | |
| 6,344,638 B1 | 2/2002 | Tomasello | |
| 6,417,499 B2 | 7/2002 | Blaker et al. | |
| 6,423,955 B1 | 7/2002 | Blaker et al. | |
| 6,657,173 B2 | 12/2003 | Flugstad et al. | |
| 6,825,618 B2 | 11/2004 | Pu et al. | |
| 6,914,226 B2 | 7/2005 | Ottaway | |
| 6,971,189 B1 | 12/2005 | Anibas | |
| 7,034,266 B1 | 4/2006 | DeGroot et al. | |
| 7,325,330 B2 | 2/2008 | Kim et al. | |
| 7,380,423 B1 | 6/2008 | Musone | |
| 7,933,733 B2 | 4/2011 | Ashrafzadeh et al. | |
| 8,035,255 B2 | 10/2011 | Kurs et al. | |
| 8,058,588 B2 | 11/2011 | Gagas et al. | |
| 8,215,133 B2 | 7/2012 | Kim et al. | |
| 8,405,467 B2 | 3/2013 | He | |
| 8,661,707 B2 * | 3/2014 | Dittmer | D06F 58/04 34/606 |
| 8,826,561 B2 | 9/2014 | Wisherd et al. | |
| 8,943,705 B2 | 2/2015 | Wisherd et al. | |
| 9,127,400 B2 * | 9/2015 | Herman | D06F 58/26 |
| 9,173,253 B2 | 10/2015 | Wohl et al. | |
| 9,194,625 B2 * | 11/2015 | Herman | D06F 58/28 |
| 9,200,402 B2 | 12/2015 | Wisherd et al. | |
| 9,447,537 B2 | 9/2016 | Wisherd et al. | |
| 9,605,899 B2 * | 3/2017 | Herman | F26B 3/347 |
| 10,006,163 B2 * | 6/2018 | Herman | F26B 3/347 |
| 2001/0035342 A1 | 11/2001 | Morse et al. | |
| 2002/0047009 A1 | 4/2002 | Flugstad et al. | |
| 2003/0224965 A1 | 12/2003 | Conley et al. | |
| 2004/0031731 A1 | 2/2004 | Honeycutt et al. | |
| 2004/0261286 A1 | 12/2004 | Green et al. | |
| 2006/0109327 A1 | 5/2006 | Diamond et al. | |
| 2007/0033829 A1 | 2/2007 | Kim | |
| 2007/0045307 A1 | 3/2007 | Tsui et al. | |
| 2007/0085689 A1 | 4/2007 | Brommer et al. | |
| 2007/0163144 A1 | 7/2007 | Dittmer et al. | |
| 2007/0251118 A1 * | 11/2007 | Doh | D06F 58/28 34/528 |
| 2007/0271814 A1 | 11/2007 | Bae et al. | |
| 2008/0307667 A1 | 12/2008 | Ikemizu | |
| 2009/0236334 A1 | 9/2009 | Ben-Shmuel et al. | |
| 2009/0255145 A1 | 10/2009 | Poy | |
| 2009/0272004 A1 | 11/2009 | Chernetski et al. | |
| 2010/0115708 A1 | 5/2010 | Caswell et al. | |
| 2010/0115785 A1 | 5/2010 | Ben-Shmuel et al. | |
| 2010/0166818 A1 | 7/2010 | Troutman | |
| 2010/0236088 A1 | 9/2010 | Paice | |
| 2011/0067186 A1 | 3/2011 | Johansson | |
| 2011/0146102 A1 | 6/2011 | Bellinetto et al. | |
| 2011/0308101 A1 | 12/2011 | Wisherd et al. | |
| 2012/0096737 A1 | 4/2012 | Kmet et al. | |
| 2012/0125909 A1 | 5/2012 | Scheunert et al. | |
| 2012/0291304 A1 | 11/2012 | Wisherd et al. | |
| 2013/0119055 A1 * | 5/2013 | Wohl | H05B 6/50 219/774 |
| 2014/0325865 A1 * | 11/2014 | Wisherd | D06F 58/266 34/255 |
| 2015/0020403 A1 | 1/2015 | Herman et al. | |
| 2015/0047218 A1 | 2/2015 | Herman et al. | |
| 2015/0047219 A1 | 2/2015 | Lee et al. | |
| 2015/0051738 A1 | 2/2015 | Lee et al. | |
| 2015/0052774 A1 | 2/2015 | Herman et al. | |
| 2015/0052775 A1 | 2/2015 | Herman et al. | |
| 2015/0089829 A1 | 4/2015 | Herman et al. | |
| 2015/0101207 A1 | 4/2015 | Herman et al. | |
| 2016/0130743 A1 | 5/2016 | Wisherd et al. | |

FOREIGN PATENT DOCUMENTS

| | | | |
|---|---|---|---|
| EP | 1 753 265 A1 | 2/2007 | |
| EP | 2583041 A1 | 4/2013 | |
| EP | 2710315 | 3/2017 | |
| EP | 2710315 B1 * | 3/2017 | F26B 3/343 |
| FR | 2930957 A1 * | 11/2009 | D06F 58/203 |
| GB | 835454 A | 5/1960 | |
| GB | 2369423 A | 5/2002 | |
| WO | 1997/032071 A1 | 9/1997 | |
| WO | 2001/057457 A1 | 8/2001 | |
| WO | 2001/066850 A1 | 9/2001 | |
| WO | 2003/019985 A1 | 3/2003 | |
| WO | WO-2004104289 A1 * | 12/2004 | D06F 58/04 |
| WO | 2011/159462 A1 | 12/2011 | |
| WO | 2012/161889 A1 | 11/2012 | |
| WO | WO-2012161889 A1 * | 11/2012 | F26B 3/343 |
| WO | 2013/074262 A1 | 5/2013 | |
| WO | 2014/104451 A1 | 7/2014 | |
| WO | 2016/077088 A1 | 5/2016 | |

OTHER PUBLICATIONS

Written Opinion of the International Searching Authority (ISA/US) dated Sep. 15, 2011 for international patent application PCT/US2011/038594 filed May 31, 2011, 15 pages.

International Search Report (ISA/US) dated Aug. 3, 2012 for international patent application PCT/US2012/033900 filed Apr. 17, 2012, 4 pages.

Written Opinion of the International Searching Authority (ISA/US) dated Aug. 3, 2012 for international patent application PCT/US2012/033900 filed Apr. 17, 2012, 6 pages.

International Search Report (ISA/US) dated Jan. 25, 2013 for international patent application PCT/US2012/061736 filed Oct. 24, 2012, 3 pages.

Written Opinion of the International Searching Authority (ISA/US) dated Jan. 25, 2013 for international patent application PCT/US2012/061736 filed Oct. 24, 2012, 5 pages.

Specification sheet for 1 KW Class E Module PRF-1150 power module, © 2002 Directed Energy, Inc., downloaded on Mar. 17, 2014 from: http://ixys.com/SearchResults.aspx?search=class+E&SearchSubmit=Go, 17 pages.

Wilson et al., Radio-Frequency Dielectric Heating in Industry, Thermo Energy Corporation, Palo Alto, California, Final Report, Mar. 1987. Retrieved from Internet: URL: http://infohouse.p2ric.org/ref/39/38699.pdf.

International Search Report (ISA/US) and Written Opinion dated Feb. 19, 2016 for international patent application PCT/US2015/058462 filed Oct. 30, 2015, 7 pages.

* cited by examiner

HYBRID RF/CONVENTIONAL CLOTHES DRYER

RELATED APPLICATIONS

This patent application is a continuation-in-part of commonly owned international patent application PCT/US2015/058462 filed Oct. 30, 2015, entitled "Fixed Radial Anode Drum Dryer", and also claims the priority benefit of commonly owned U.S. provisional patent application 62/493,883 filed Jul. 19, 2016, entitled "Hybrid RF/hot air clothes Dryer", which two patent applications are hereby incorporated by reference in their entireties into the present patent application; this patent application also incorporates by reference in its entirety commonly owned U.S. Pat. No. 9,200,402 B2 issued Dec. 1, 2016, entitled "Dielectric Dryer Drum".

TECHNICAL FIELD

This invention pertains to the field of drying one or more items in an enclosed container, and, in particular, to drying a load of clothes.

BACKGROUND ART

Conventional clothes dryers utilize warmed air to facilitate the drying of a load of clothes. Recently, a newer technology, exemplified by the above-cited PCT patent application and issued U.S. patent, has appeared on the horizon, in which items to be dried are subjected to a capacitive AC electrical field generated by an RF power source (RF technology).

Other examples of this new RF technology are further described in U.S. Pat. No. 8,826,561 B2 issued Sep. 9, 2014, entitled "High Efficiency Heat Generator"; U.S. Pat. No. 8,943,705 B2 issued Feb. 3, 2015, entitled "Dielectric Dryer Drum"; U.S. Pat. No. 9,173,253 B2 issued Oct. 27, 2015, entitled "Ionic Adder Dryer Technology"; and U.S. Pat. No. 9,447,537 B2 issued Sep. 20, 2016, entitled "Fixed Radial Anode Drum Dryer"; all four of these issued U.S. patents are also hereby incorporated by reference in their entireties into the present patent application.

The instant patent application describes novel and non-obvious techniques for advantageously combining the older and the newer drying technologies.

DISCLOSURE OF INVENTION

The present invention encompasses methods and apparati for heating a load (9) such as clothes immersed in a medium (such as water) during a heating period. A method embodiment of the present invention comprises heating the load (9) and medium within an enclosure (10) by subjecting said load (9) and medium to heated air (104) originated from a conventional energy source (1); and applying heat to said load (9) and medium within the enclosure (10) via an AC electrical field, embodied as a capacitor, originated from an RF power source (2).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF PREFERRED EMBODIMENTS

Figure 1:
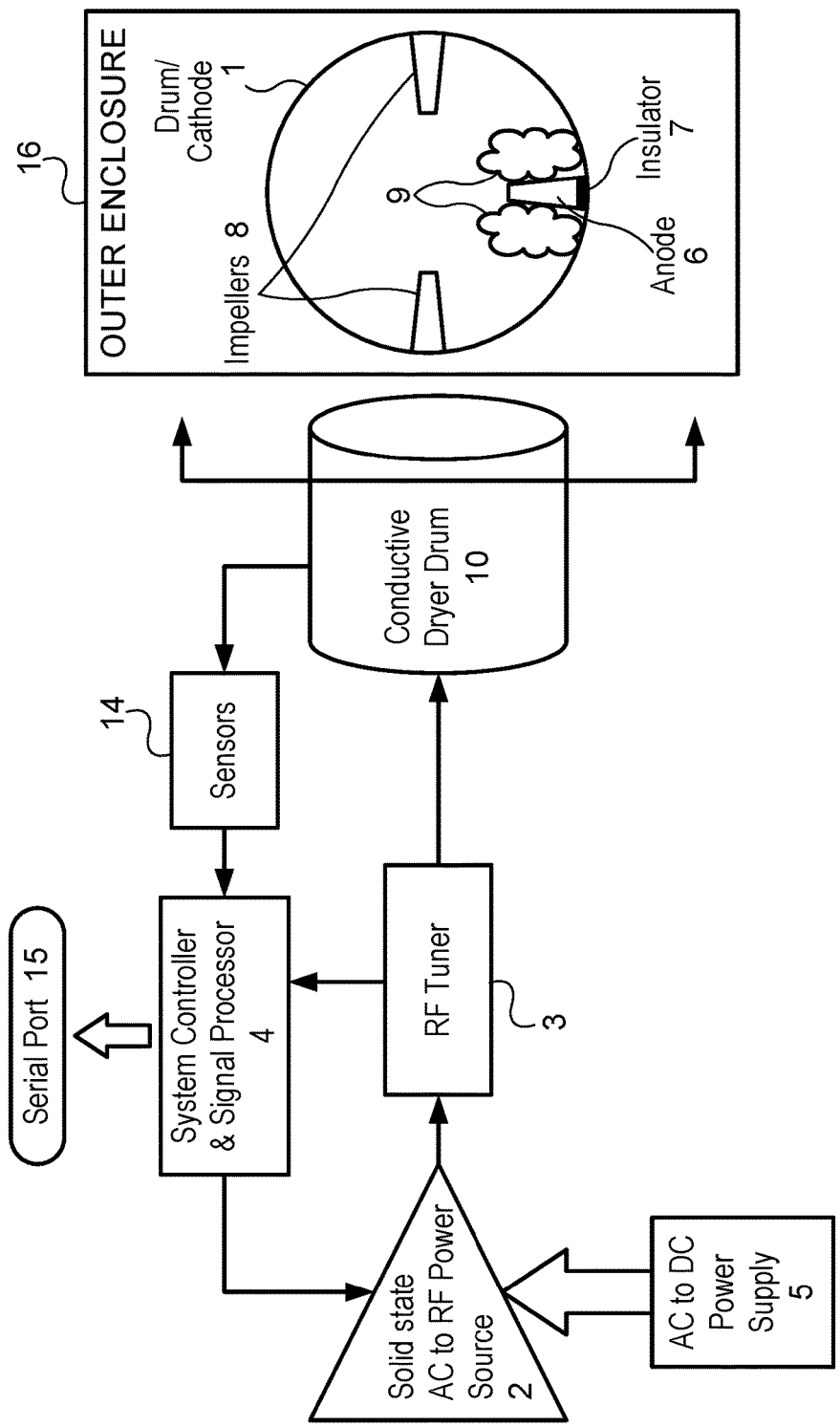
FIG. 1 is a block diagram of the RF energy source of the present heating system configured for drying clothes 9. A front view of drum 10 is shown, depicting axial anode 6 and impellers 8.

Reference now is made in more detail to embodiments of the present invention, examples of which are illustrated in the accompanying drawings. While the present invention will be described in conjunction with the various embodiments, it will be understood that they are not intended to limit the present invention to these embodiments. On the contrary, the present invention is intended to cover alternatives, modifications, and equivalents, which may be included within the spirit and scope of the various embodiments as defined by the appended claims.

In the following detailed description, numerous specific details are set forth in order to provide a thorough understanding of the presented embodiments. However, it will be obvious to one of ordinary skill in the art that the presented embodiments may be practiced without these specific details. In other instances, well-known methods, procedures, components, and circuits have not been described in detail, so as to not unnecessarily obscure aspects of the presented embodiments.

FIGS. 1 through 9 illustrate general embodiments of the RF dielectric heating technology portion of the present invention.

Cylindrical drum 10 is electrically conductive in the illustrated embodiment, and is used as a cathode. Electrically conductive anode 6 is axially positioned within drum 10. Together, anode 6 and drum/cathode 10 form a capacitor whose electrical field is used to heat the load 9. An air flow 11 (see FIG. 2) is used to efficiently carry evaporated water out of the drum 1.

Figure 2:
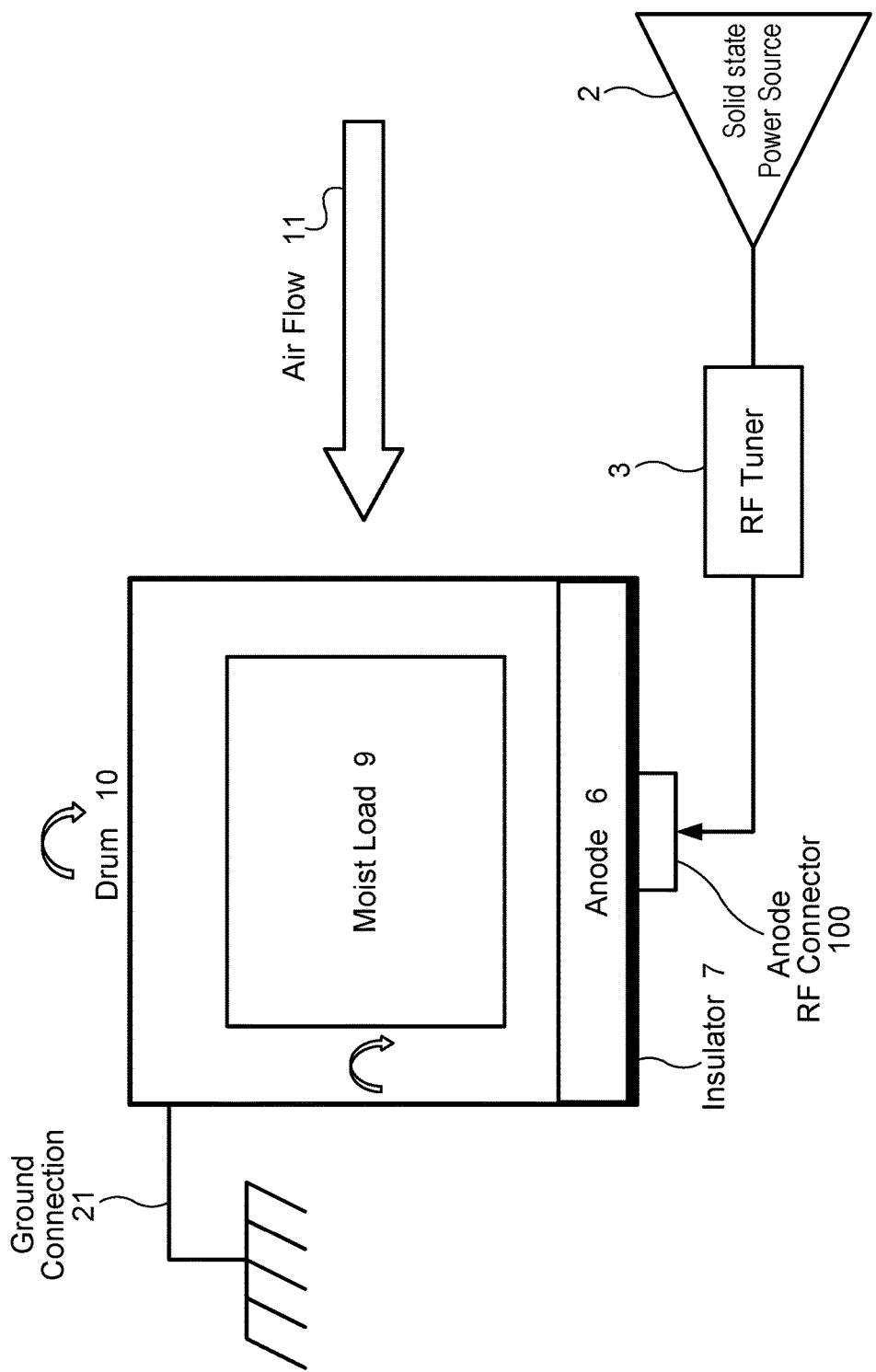
FIG. 2 is a schematic view of the structure of the apparatus associated with the RF energy source 2.

An axially disposed electrically conductive anode 6 sitting on top of an insulator 7 is coupled to solid state low frequency RF power supply 2 through a tuning network 3 and connector 100 (shown in FIG. 2). System controller 4 provides controlling signals to power source 2, and receives inputs from tuner 3 and a sensor network 14. The power source 2 is powered by an AC to DC power supply 5. Dryer drum 10 is electrically conductive, and acts as a cathode to complete the electrical circuit. Impellers (vanes) 8 are used to stir up the load (typically wet clothes) 9 inside the drum 10, which is rotating in preferred embodiments. Impellers 8 may or may not be electrically connected to anode 6.

This way to introduce RF 2 into the drum 10 allows the user to maintain a constant size and volume of the drum 10 (and therefore use conventional enclosures 16), without needing any moving parts inside the drum 10. Also, tuning the reactive component out of the load 9 can be readily and advantageously accomplished by turning on or off, electrically, some or all of the anode impeller vanes 8 inside the drum 10, for those embodiments where impellers 8 are electrically connected to anode 6.

In embodiments of the present invention, anode 6 has a double function: to scramble the items 9 being heated (typically, a load of clothes) as an additional impeller 8 for giving the clothes 9 better exposure to the air flow 11 that removes the moisture, and to provide the RF connection.

In embodiments of the present invention, each anode element 6, 8 is separated from the conductive drum 10 by an insulating material 7.

In embodiments of the preset invention the metal anode(s) 6,8 is/are protected from corrosion from the wet clothes 9 by an insulating material.

In embodiments of the present invention, the drum 10 material is selected from the group consisting of: an electrical conductor; a metal; an insulator; a dielectric insulator; a ceramic insulator; a plastic insulator; a wooden insulator; and a mixture of at least two of the above materials. In embodiments where drum 10 is not an electrical conductor, drum 10 does not act as a cathode, and so a separate cathode must be provided in order to complete the electrical circuit.

In embodiments of the present invention, item 9 is an item from the group consisting of: a cloth substance; a plastic substance; and a chemical substance. In preferred embodiments, item 9 comprises a moist load of clothing and/or other fabrics, such as towels, bedsheets, etc.

In preferred embodiments of the present invention, all drum 10 surfaces are electrically grounded.

FIG. 2 shows a dryer appliance conductive drum 10 where the single, low frequency electrical capacitive RF signal 2 is injected into the anode 6 (placed inside drum 10, and separated from drum 10 by insulator 7) through an RF tuner 3 and RF connector 10. Power is provided from a single, low frequency RF solid state source 2. FIG. 2 schematically shows air flow 11 entering drum 10 from the side; in practice, air flow 11 normally enters drum 10 from the bottom.

Drum 10 rotates within outer enclosure 16 (see FIG. 1), with a heating electrical current applied to load 9 powered by a solid state, single frequency RF source 2 through RF tuner 3 to RF electrically conductive anode 6 through a fixed bottom anode drum connector 10. RF Load impedance Z, load size, and other parameters are measured by sensors 14 (see FIG. 1) to help system controller 4 (see FIG. 1) determine a time to end the drying, and to control settings of power source 2. Ground connection 21 completes the circuit.

Figure 9:
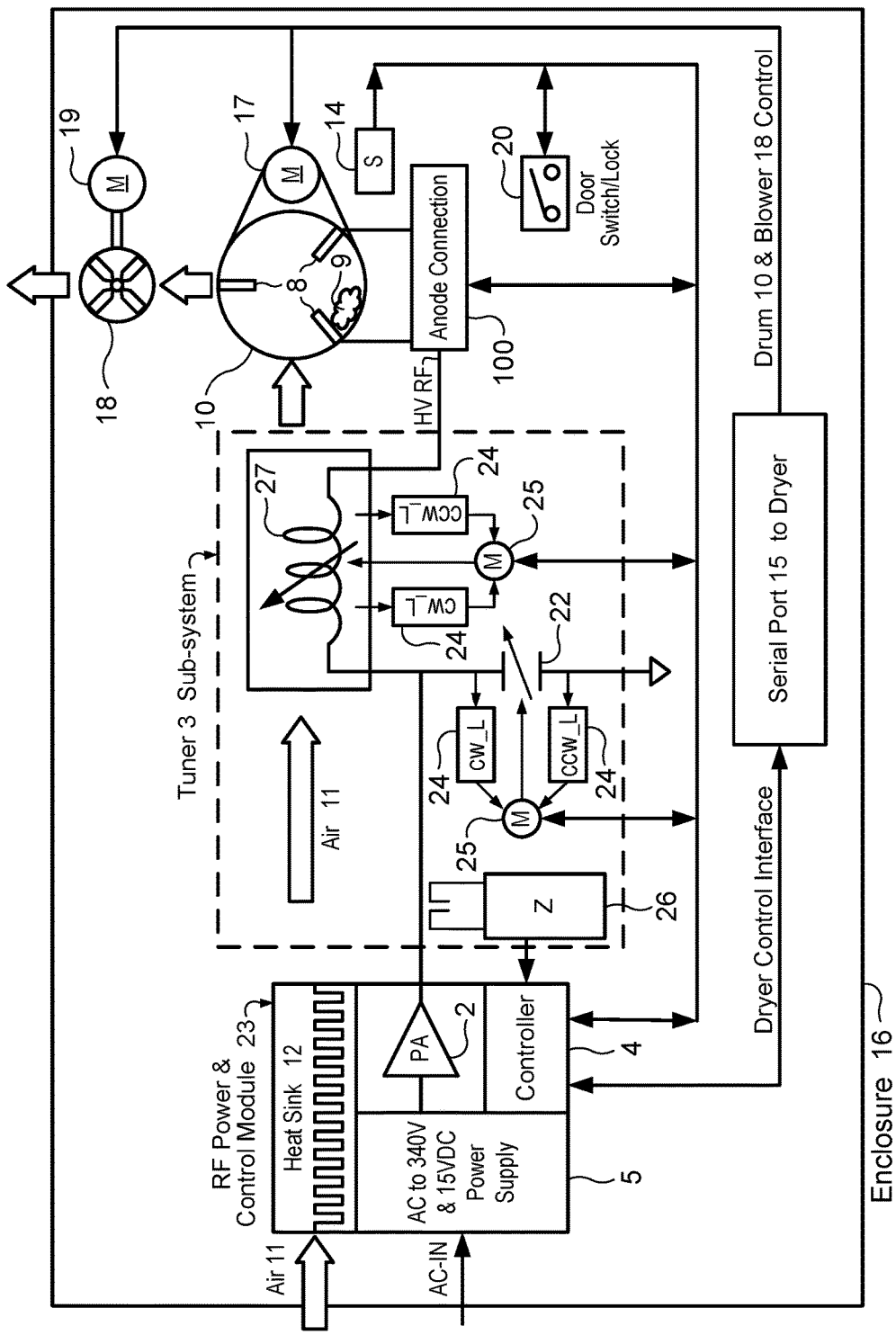
FIG. 9 is a detailed block diagram of an embodiment of the RF technology.

All the elements of FIG. 2 can be enclosed inside an outer enclosure 16, e.g., a cabinet, as shown in FIG. 9. A suitable solid state RF power source 2 suitable for use in the present invention is disclosed in "Specification sheet for 1 KW Class E Module PRF-1150 power module, © 2002 by Directed Energy, Inc., downloaded on Mar. 17, 2014 from: http://ixys.com/SearchResults.aspx?search=class+E&SearchSubmit=Go", which document is hereby incorporated by reference in its entirety into the present patent application.

The RF outputs of more than one such solid state power source 2 may be combined to provide higher powers that may be useful or needed to dry large loads 9, as is done in one embodiment of the present invention.

In preferred embodiments of the present invention, the single, low frequency electrical capacitive RF signal is selected to be in the range of 1 MHz to 50 MHz.

This range of wavelengths is sufficiently large for the electrical capacitive energy to penetrate most materials 9 to be dried in conventional size consumer appliances 16, and low enough to be easily produced with solid state device power sources 2.

In embodiments of the present invention, the drum 10 is agitated continuously while the energy from the single, low frequency electrical capacitive RF source 2 is applied through the tuner 3 and RF connector 100.

In other embodiments of the present invention, the single low frequency, electrical capacitive RF signal 2 is intermittently applied to anode 6. This intermittent application may occur only while the drum 10 is in a static position, with the clothes 9 resting at the bottom of the drum 9, and not when the drum 10 is rotated. In such cases, drum 10 is then subsequently rotated to improve the air removal of the moisture and to randomize the deposit of the clothes 9 on the bottom of the drum 10. This sequence is repeated until the clothes 9 reach a desired preselected level of remaining moisture, as measured by sensors 14. Selections of the power-on time length and rotating-drum time length are optimized to provide maximum drying efficiency and minimum drying time. The selections can be made by system controller 4, based upon preselected criteria that have been programmed into controller 4.

The low frequency electrical capacitive RF energy from source 2 causes water evaporation from the clothes 9, whereas air flow 11 is used to carry the evaporated humidity out of the drum 10 and out of outer enclosure 16.

In embodiments of the present invention, the impedance Z that the drying clothes present to the single low frequency RF solid state source 2 through RF tuner 3 is monitored by sensors 14 and used by system controller 4 to determine the end point of the drying process.

In embodiments of the present invention, the conductive cathode area of the rotating drum 10 is connected to the ground return path of the RF power source 2 by a rotating or non-rotating capacitive connection 21.

Figure 6:
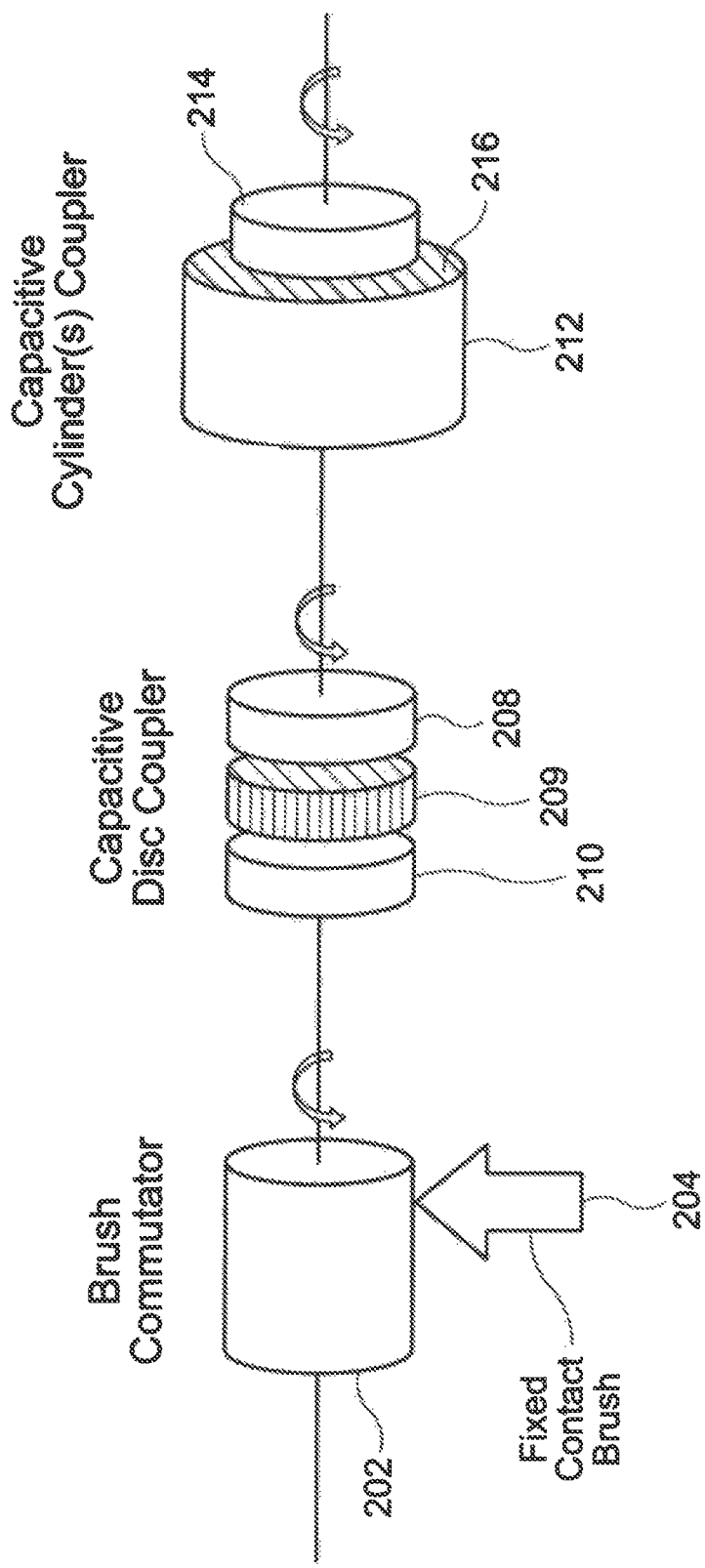
FIG. 6(a) is a sketch of an embodiment showing anode 6 coupled to RF tuner 3 using a fixed contact brush 204.
FIG. 6(b) is a sketch of an embodiment showing anode 6 coupled to RF source 2 and tuner 3 via a capacitive disk coupler comprising three axially aligned disks 208, 209, 210.
FIG. 6(c) is a sketch of an embodiment showing anode 6 coupled to RF source 2 and tuner 3 via a single capacitive cylinder disk coupler.

In embodiments of the present invention, connector 100 comprises a rotating RF anode plate connector 202, 204, 210 of the type shown in FIG. 6.

Figure 3:
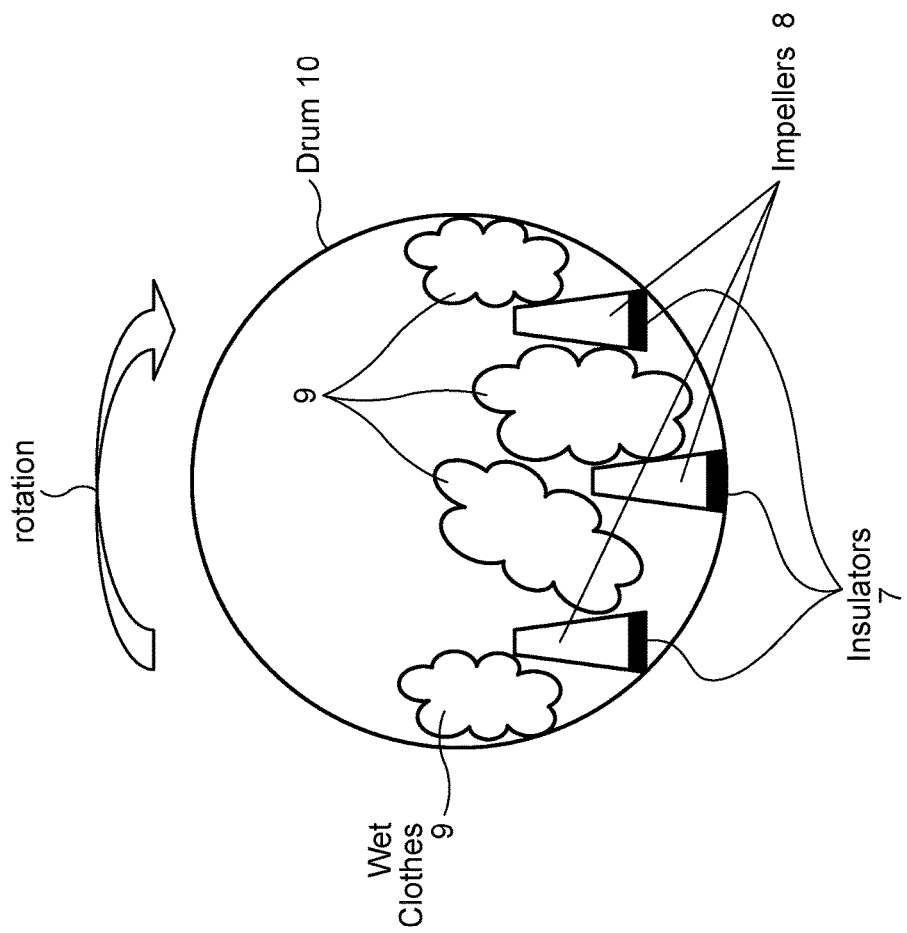
FIG. 3 shows an embodiment of the RF energy source 2 featuring several anode impellers 8 inside drum 10, each separated from drum 10 by insulators 7, with clothes 9 in contact with both the set of anode impellers 8 and the body of the drum 10 acting as a cathode.

In other embodiments of the present invention, as shown in FIG. 3, there are several anode impellers 8 inside the conductive drum cathode 10; each impeller 8 is electrically connected to anode 6 and separated from drum 10 by insulator 7. Each anode impeller 8 is driven with RF energy and is therefore a "hot anode", with the ground return being the entire drum 10. Each impeller 8 is shaped and placed into the drum 10 in a manner to maximize RF coupling to the tumbling or stationary load 9, while minimizing non-load-coupled parasitic capacitance.

In embodiments of the present invention, the insulating material separating the electrically conductive anode elements 6, 8 from the drum 10 is selected from the group consisting of glass; plastic; and ceramic.

The selection of the capacitive electrical energy wavelength has a lower limit, to avoid creating coupling of the drying energy to small metal objects that may be inside the drying load 9 of clothes.

Figure 4:
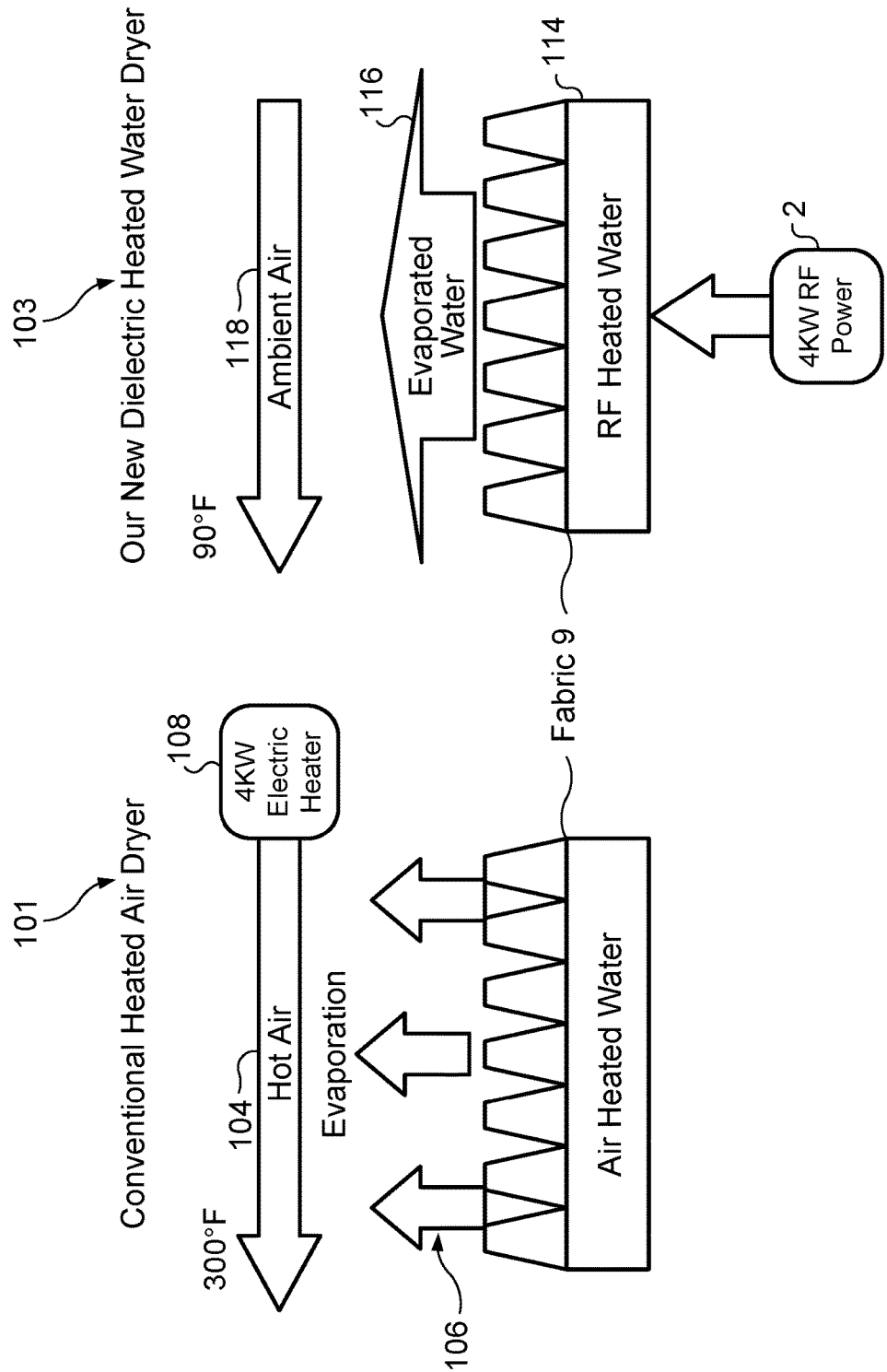
FIG. 4 illustrates a comparison between a conventional heated air dryer 101 and the dielectric RF dryer 103 when heating is supplied by the RF energy source 2.

FIG. 4 illustrates comparison between a conventional heated air dryer 101 and the dielectric dryer 103 of the present invention.

In the conventional heated air dryer 101, hot air 104 passes over the clothes surface, the hot air 104 both heats and removes surface moisture, and water inside the fabric must wick to the surface for removal.

The present RF dielectric heating 103, on the other hand, uses dielectric heated water 114. The long wavelength single low frequency RF energy 2 adds energy to the water in the fabric 9, uniformly vaporizing the water throughout the fabric 9. Within the selected low frequency range, the long wavelength penetrates through all of the clothes 9. A conventional size consumer clothes dryer enclosure 16 can be used to house components of the present invention. Air flow 118 is used only for removal of the evaporated water 116. The size of the drum 10 is not in any way related to the RF frequency. The basic processes of clothes 9 heating and water removal are totally separated in the present embodiment 103; this is non-obvious in view of the prior art.

In the conventional heated air dryer 101, a 4 kW electric heater 108 causes heating of the hot air 104 that is preset inside the dryer up to 300° F. This hot air is used to heat the water 106 containing the clothes, evaporate the moisture, and blow the humidified air out of the dryer. Such hot temperature adversely affects the properties of the drying fabric.

On the other hand, in the dielectric dryer 103 of the present embodiment, the 4 kW applied RF power 2 causes evaporation of the RF heated water 114, but does not cause heating of the ambient air 118, which has temperature only up to 90° F. (room temperature). Such ambient temperature does not adversely affect the properties of the drying fabric 9, illustrating the superiority of the present embodiment 103.

Figure 5:
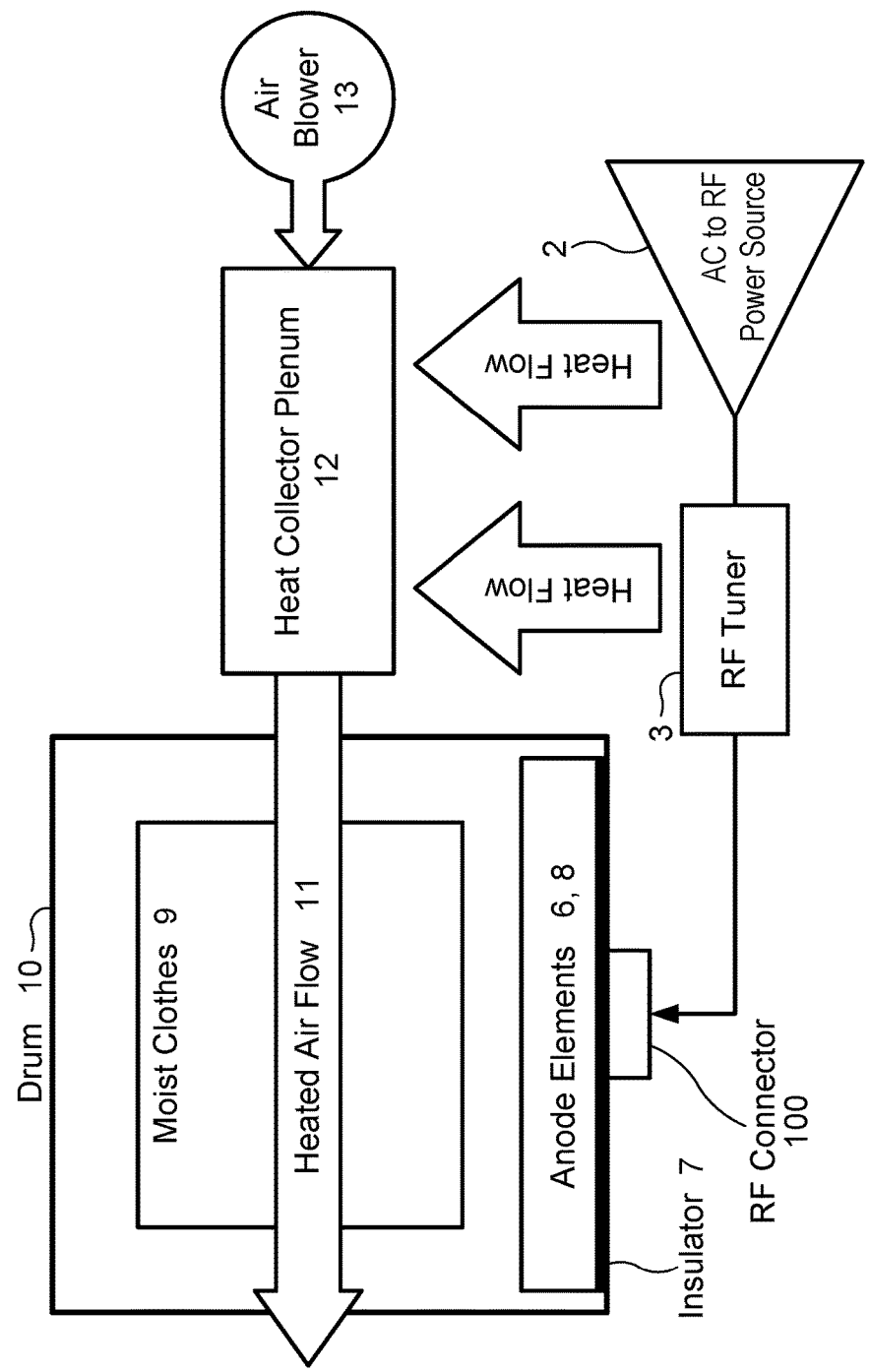
FIG. 5 is a block diagram of an embodiment of the RF technology in which dryer efficiency is improved by recovering the heat generated from the operating solid state RF source 2 and RF tuner 3, and transferring the heat to a heated air collector plenum 12, while simultaneously and advantageously providing cooling for the electronics 2, 3.

FIG. 5 shows an embodiment of the present invention in which heat recovery is employed. Heat dissipation from power source 2 and RF tuner 3 is channeled upward into a heat collector plenum 12. Air blower 13 blows air through plenum 12 and drum 10. The resulting heated air flow 11 dries the ambient air within drum 10, and expels the air out the enclosure 16. This improves the overall energy efficiency of the system.

In embodiments of the present invention, the direction of rotation of drum 10 is varied to prevent bunching of the drying load 9.

In embodiments of the present invention, the system controller and signal processor 4 is configured to control parameters of the configurable RF waveform power source 2 in real time by using real time data provided by the block 14 of RF and physical sensors.

In embodiments of the present invention, the shape of anode elements 6, 8 is selected to optimize RF load coupling while minimizing parasitic capacitance to ground.

In embodiments of the present invention, the shape of anode elements 6, 8 is optimized to accommodate for different kinds of fabrics 9 and different kinds of load 9.

In embodiments of the present invention, the rotating RF anode plate connector 100 is selected from the group consisting of a brush-contact commutator; and a capacitive coupling.

In embodiments of the present invention, the rotating RF anode connector 100 comprises a capacitive or non-capacitive coupling selected from the group consisting of: a parallel plate; and at least one concentric cylinder.

FIG. 6 illustrates three acceptable connections 100 to rotating cathode 10 and anode 6, 8 elements. In all three examples, the anode 6 is assumed to rotate with the drum 10, as indicated by the arrows in each of FIGS. 6(*a*), 6(*b*), and 6(*c*).

In a first embodiment, the anode 6 is coupled to the RF tuner 3 by using a fixed contact brush 204 that is coupled to tuner 3 and makes contact with a rotating brush commutator 202 that is coupled to the rotating anode 6, as shown in FIG. 6(*a*).

In a second embodiment, shown in FIG. 6(*b*), anode 6 is coupled to the RF source 2 and tuner 3 via a capacitive disc coupler comprising three axially aligned discs 208, 209, 210. In this embodiment, the inner (rightmost) disc 208 rotates and is coupled to the anode 6, the center disc 209 is an insulator, and the outer (leftmost) disc 210 is stationary and coupled to tuner 3.

In a third embodiment, anode 6 is coupled to RF source 2 and tuner 3 via a single capacitive cylinder disc coupler, as shown in FIG. 6(*c*). In this embodiment, the inner (rightmost) cylinder 214 is rotating and connected to anode 6, dielectric spacer 216 radially surrounds cylinder 214 and is an insulator, and the outer (leftmost) disc 212 is stationary and coupled to tuner 3.

Figure 7:
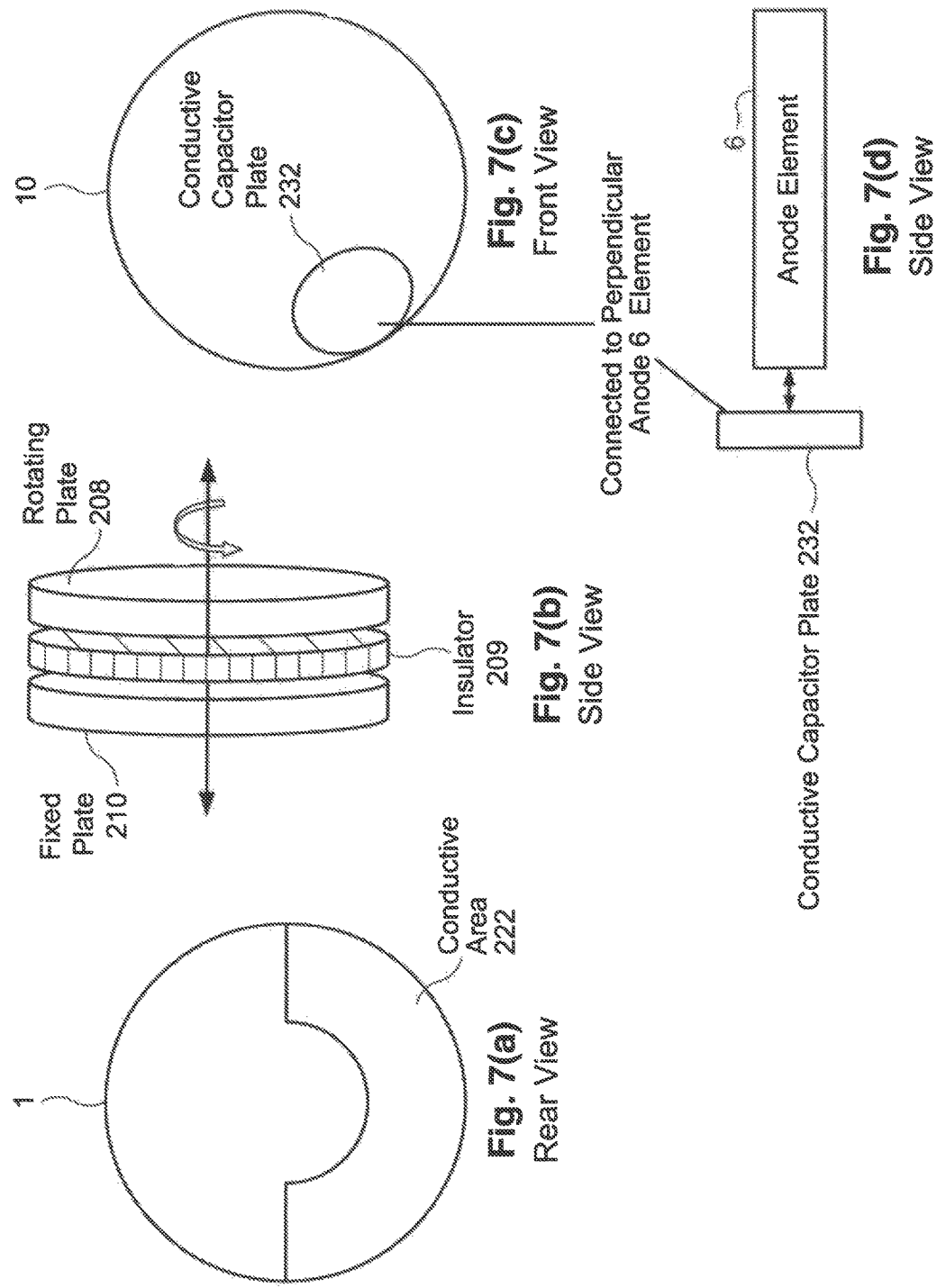
FIG. 7(a) is a rear view of an embodiment of the present invention in which a variable anode element coupling is employed to implement the capacitive disk coupler of FIG. 6(b).
FIG. 7(b) is a side view of the embodiment of FIG. 7(a).
FIG. 7(c) is a front view of the embodiment of FIG. 7(a).
FIG. 7(d) is a side view corresponding to FIG. 7(c).

FIG. 7 illustrates an embodiment of the present invention in which variable anode element coupling is employed to implement the capacitive disc coupler of FIG. 6(*b*). The coupling comprises three concentric plates: fixed plate 210, insulator 209, and rotating plate 208, as shown in the FIG. 7(*b*) side view and in FIG. 6(*b*). Typically, only a portion 222 of fixed plate 210 needs to be electrically conductive, as shown in the FIG. 7(*a*) rear view. Conductive capacitor plate 232 is attached to the anode 6, as shown in the FIG. 7(*d*) side view. FIG. 7(*c*) is a front view showing a typical location for plate 232 within drum 10.

Figure 8:
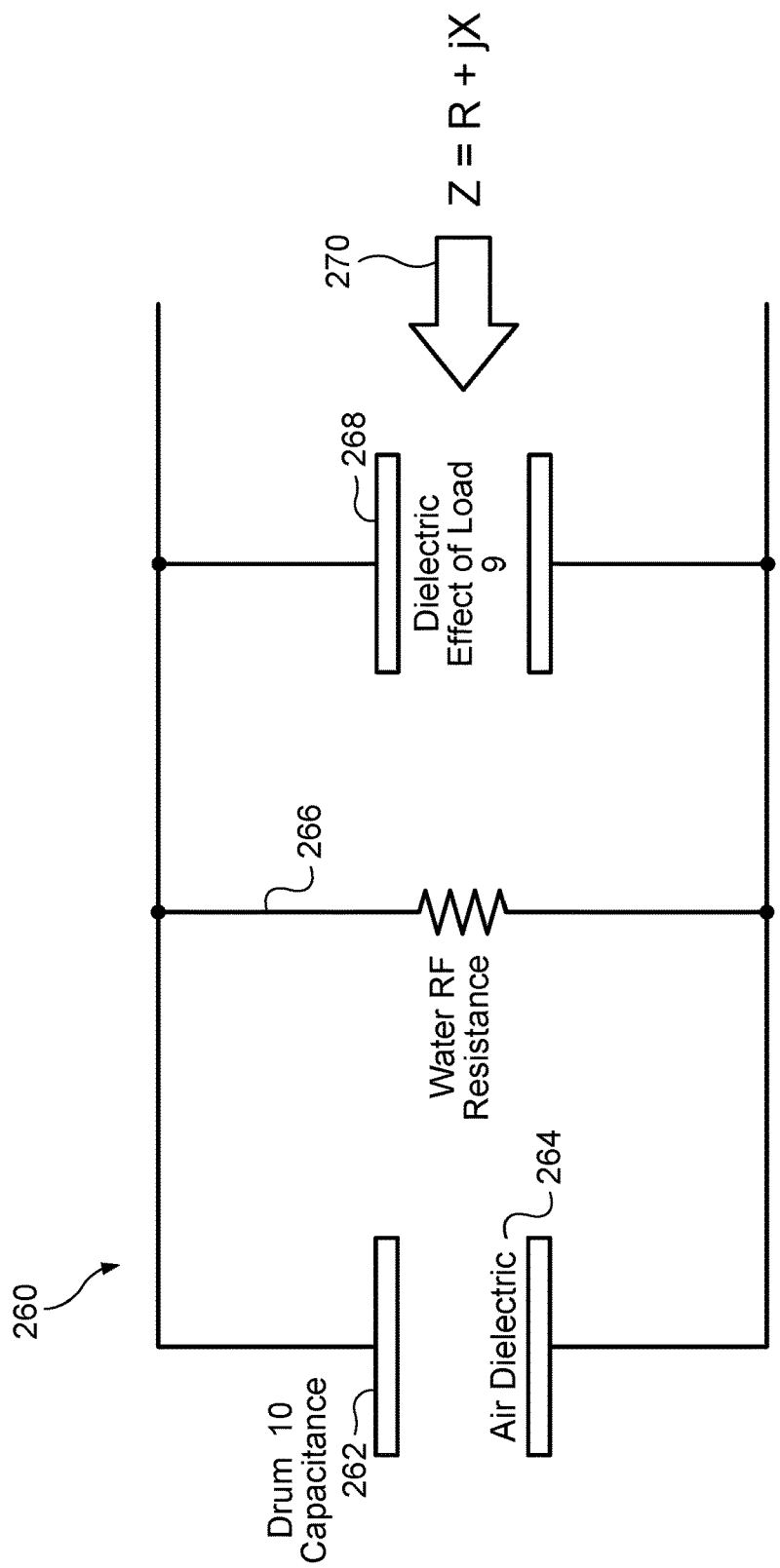
FIG. 8 is a simplified circuit diagram 260 showing a dielectric load model of the dielectric dryer drum 10.

FIG. 8 shows a dielectric load model 260 of the circuit of dielectric dryer drum 10.

The drum 10 has an inherent capacitance 262, based on its physical dimensions and the permittivity of the air dielectric 264 that is present between the cathode 10 and anode 6, 8. The water in the load 9 has an RF resistance 266 related to the amount of water. The materials in the load 9 add an additional capacitance 268 to the model 260; their dielectric constant is greater than 1. Thus, the overall load impedance 270 Z is:

$$Z = R + jX \qquad \text{a.}$$

The load impedance Z is dependent upon the size, water content, fabric type, and physical shape and volume of the load 9.

The present invention seeks to dynamically maximize RF coupling to the load resistance (water). The design optimizes the tuning to the current value of the water resistance, while minimizing parasitic capacitance 268.

In embodiments of the present invention, the capacitive element 268 of the load 9 can be minimized by changing the number of impellers 8 that are actuated electrically by controller 4 (see FIG. 1), by mechanically interspersing coupling capacitors between pairs of impellers 8, and by dynamically changing the tuning of the LC network 3, 22 shown in FIG. 9 with positional signals from digi-switches 24 and 25 and impedance Z measuring network 26.

In embodiments of the present invention, as illustrated in FIG. 9, parameters such as the RF impedance Z of the load 9 as measured by sensor 26 and the amount or percentage of water in the load 9 as measured by a sensor 14 are fed in real time to controller 4, which then determines the end time for the heating process. Controller 4 then stops the heating by means of shutting down power source 2. In other embodiments, controller 4 changes the values of tuning capacitor 22 and/or tuning inductor 27 in real time, by means of sending control signals to one or both of the motors 25 that control the physical settings of capacitor 22 and inductor 27, respectively. Controller does this, for example, to remove the reactive component (jX) out of impedance Z as much as possible, to maximize the efficiency of the system.

FIG. 9 depicts a dielectric heating system block diagram comprising a DC power supply 5, a real time configurable RF waveform power source 2, a system controller and signal processor module 4, a serial port 15, a set 14 of RF and physical sensors, dryer drum 10, and related components. Serial port 15 can be used to change parameters within controller 4 via an outboard computer (not illustrated). These parameters can include the preselected degree of humidity that will cause controller 4 to shut down application of power from RF source 2 in order to end the drying process. Physical characteristics such as heat and humidity are measured by sensors 14 and fed to controller 4 via serial port 15. Impedance Z as measured by sensor 26 and microswitch 24 positions are also fed to controller 4, which adjusts operating characteristics (e.g., power, amplitude, duration, pulsing) of RF source 2 so that the dryer operation stays within preselected ranges. This measurement and control can be accomplished, e.g., by one or more feedback loops.

Modules 2, 4, 5, and 12 can be fabricated together as a single RF Power and Control Module 23.

Anode(s) 6, 8 connection 100 can be implemented by any of the couplings shown in FIGS. 6 and 7.

Drum 10 is rotated by motor 17. Motor 17 or another motor 19 can be used to activate exhaust fan 18 to facilitate the expulsion of ambient air out of enclosure 16. Door switch/lock 20 can be manually or electronically activated to operate a physical door through which load 9 is inserted into the drum 1 prior to drying, and removed from drum 10 subsequent to drying.

In embodiments of the present invention, the heating process is controlled by selecting parameters of the real time configurable RF waveform power source 2 from the group consisting of: an applied RF voltage magnitude and envelope wave shape; an applied RF current magnitude and envelope wave shape; phase of RF voltage vs. current; voltage standing wave ratio (VSWR); and RF frequency.

In embodiments of the present invention, RF tuner 3 can comprise a subsystem including variable tuning inductor 27, variable tuning capacitor 22, and impedance sensor 26. Values of inductor 27 and capacitor 22 are adjusted by means of controller 4 actuating clockwise and counter clockwise digi-switches 24, which in turn control a pair of motors 25 that control the values of inductor 27 and capacitor 22 in real time. The object of this control is to tune out the (–jX) from the load RF impedance Z, thus yielding a pure resistive load R at the anode connection 100. This maximizes drying efficiency.

In embodiments of the present invention, the set 14 of physical sensors is configured to measure the size and water content of the load 9, the load 9 temperature, and parameters of the air flow 11 within drum 10. As discussed above, sensors 14 feed these parameters to controller 4 via serial port 15.

In embodiments of the present invention, the method for heating an object 9 having a variable weight that includes a medium comprises the step of placing the object 9 having the variable weight including the medium into an enclosure 16; wherein the object 9 substantially has absorbed the medium in a first "cool" state; and the object 9 includes a maximum weight in the first "cool" state due to absorption of the medium.

In embodiments of the present invention, the method for heating an object 9 having a variable weight that includes a medium further comprises the step of initiating a heating process by subjecting the object and medium to a low frequency RF electrical current 2 inside a capacitive enclosure 10 where there is electrical contact of the object 9 to the anode 6 and cathode 10 electrodes, the object is substantially free from the medium in a second "heated" state due to substantial release of the medium from the object, and the released medium is evaporated during the heating process.

In embodiments of the present invention, the method for heating an object 9 having a variable weight that includes a medium further comprises the step of controlling the heating process by controller 4, wherein controller 4 completes the heating process when the object is substantially transitioned into the second "heated" state. "Substantially transitioned" is defined by preselected parameters that have been programmed into controller 4.

In embodiments of the present invention, the method for heating an object 9 having a variable weight that includes a medium further comprises the step of using an air flow 11 having an ambient or heated temperature inside the enclosure 16 to carry away the evaporated medium from the enclosure 16.

In embodiments of the present invention, the enclosure comprises a dryer drum 10 that serves as a cathode, and at least one anode vane 8 of variable shape; the object comprises a load of clothing 9; and the medium comprises water. The method for heating the load of clothing 9 further comprises the step of optimally configuring the shape of at least one anode vane (impeller) 8 to accommodate for different kinds of fabrics and different kinds of load 9.

In embodiments of the present invention, the method for heating the load of clothing 9 further comprises the step of pre-heating ambient air inside the dryer drum 1 to facilitate water evaporation from the drum 10.

In embodiments of the present invention, the method for heating the load of clothing 9 further comprises the step of controlling an air flow 11 rate by measuring the air flow, preferably in real time, by an air flow sensor 14, and by utilizing system controller 4 to regulate the air flow 11 rate, taking into account the measured air flow 11 rate.

In embodiments of the present invention, the method for heating the load 9 further comprises the step of controlling an air flow 11 path by a variable element design selected from the group consisting of: an intake air duct design (not shown); a chamber design (not shown); and a drum impeller 8 design. The design is configured to facilitate removal of evaporated water from the enclosure 16.

Preferred embodiments of the present invention use a combination of direct RF dielectric heating 103 from an RF energy source 2 and heated air from one or more conventional energy sources 1 to dry fabric 9 immersed in a medium (usually water) in a hybrid clothes dryer enclosure 10. These energy sources 1, 2 evaporate water in the drying process, and can be used together and/or separately. The goal is to optimize drying speed, efficiency and fabric 9 care. The process can be varied by breaking up the total heating period into distinct phases of operation. Parameters that may be selected for each phase include running time, varying the energy level from one or both of the sources 1, 2 (including turning off one or both of the energy sources 1, 2 completely), varying air flow 104, 12 rate, and varying energy source 1, 2 type(s) used. In addition, drum 10 rotation speed (including stopping the rotation completely) and direction of the rotation can be changed at any time during the heating period, to optimize performance.

Embodiments of the present invention include using recovered heat 12 from RF electronics 2, 3 to augment the drying process. The hybrid dryer 10 thus adds heat produced separately from the RF electronics heat energy recovery plenum 12 described earlier. The separate component of recovered heated air 12 adds energy to the conventionally heated air 104 that passes through the fabric load 9, to enhance the drying effect of the RF energy 103. This recovered heated airflow 12 can be in the same air inlet 13 to air outlet 11 illustrated in FIG. 10, or in a separate path or paths.

The air paths for the conventionally heated air and the recovered heated air 104, 12 can be operated separately, e.g., by using air valves 131, 132 to select and/or divert the desired air flows 104, 12.

Unheated airflow can also be used to both recover heat stored in the dryer drum 10 and to assist in the drying process.

Figure 10:
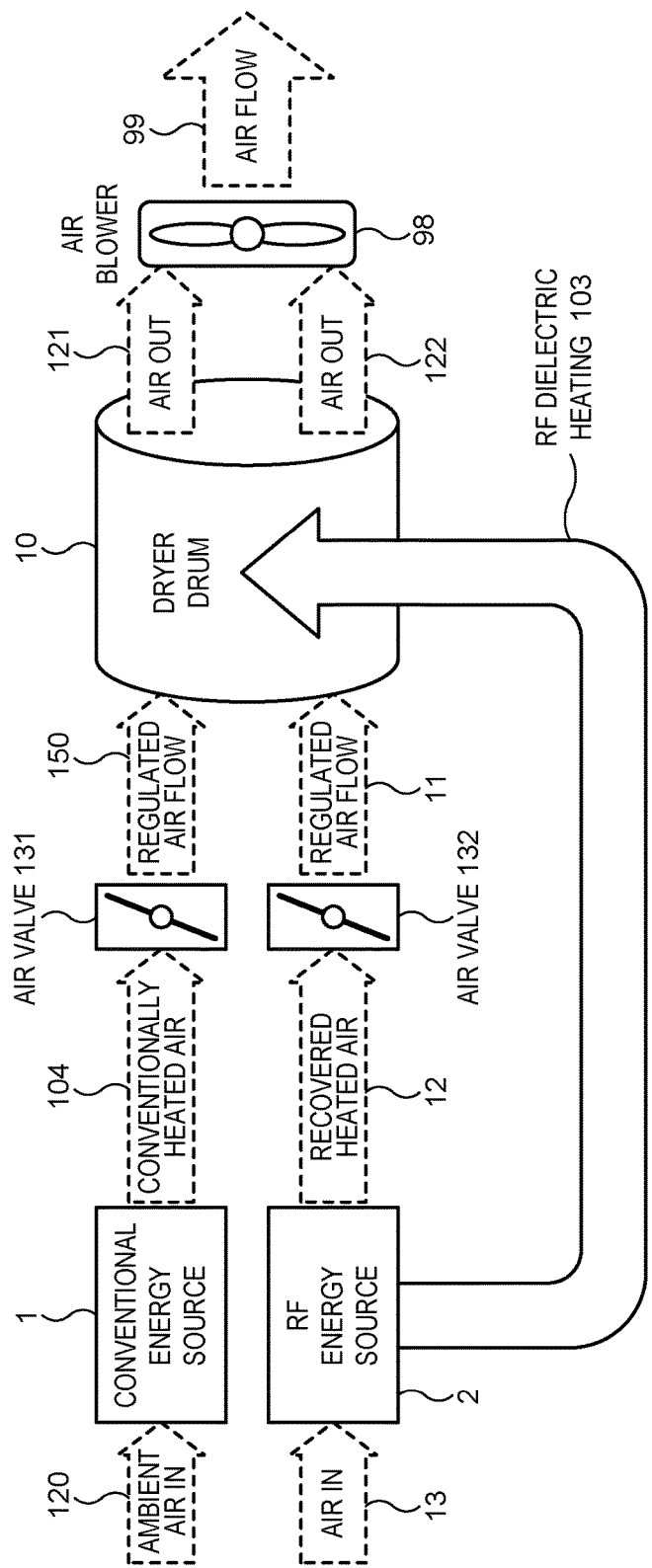
FIG. 10 is a schematic diagram of the present invention showing a combination of the older conventional drying technology with the newer RF drying technology.

The conventional energy source 1 can be any source of energy such as AC electricity, DC electricity and/or gas, such as natural gas. Air flow 99 for both RF and conventional systems 12, 104 can be made to vary, e.g., by using a variable speed air blower 98. FIG. 10 illustrates a pull type of air blower, in which blower 98 sucks air out of the dryer drum 10 to produce an output air flow 99. This air 121, 122 that is sucked out can be attributable to the conventionally heated air 104 and also to the recovered heated air 12 in embodiments where recovered heated air 12 is used. Alternatively, air blower 98 can be a push type of air blower, which pushes air through dryer drum 10 to produce the output air flow 99.

Figure 11:
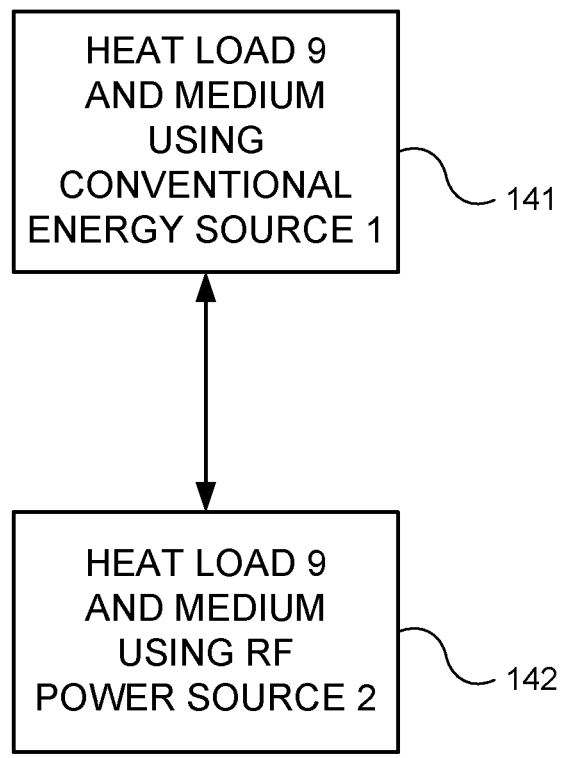
FIG. 11 is a flow diagram illustrating a method embodiment of the present invention. The two arrowheads indicate that the order of performing steps 141 and 142 is arbitrary, and that these two steps 141, 142 can be performed simultaneously or by themselves.

FIG. 11 illustrates a method embodiment of the present invention. In step 141, load 9 and the medium are heated using conventional energy source 1. In step 142, load 9 and the medium are heated using the RF power source 2. In some embodiments, the two steps 141, 142 are not applied simultaneously at any time during the heating period. In other embodiments, the two steps 141, 142 are applied simultaneously during at least a portion of the heating period.

The hybrid RF/conventional dryer of the present invention can be operated in one or more of a plurality of modes, such as:

1. Operating the RF energy generator 2 with its heat recovery flow path 12 open. The separate conventionally heated air path 104 can be closed with its air path valve 131 shut during this time, to prevent leaks. The conventional heater 1 can thus be turned off during this phase of drying.
2. The conventional heater 1 is turned on, and its air path valve 131 is opened. The RF energy generator 2 is turned off during this time, and its air path valve 132 is closed.
3. Both energy sources 1, 2 are turned off, and only unheated airflow is sent to the dryer 10. This unheated airflow can be used near the end of the total drying period, as in a conventional clothes dryer. This unheated air can be used to recover heat from both electronics 23 and chassis 16 mass temperatures. In this embodiment, both air valves 131, 132 are opened.
4. The air flow valves 131, 132 for the two paths 104, 12 can be located anywhere in the respective air flow paths 104, 12. For example, FIG. 10 illustrates that the valves 131, 132 are located at the outputs of the respective energy sources 1, 2, but the valves 131, 132 can be located at the inlets 120, 13 of the energy sources 1, 2.
5. The two air flows 150, 11 can enter the drum 10 at different points, for best efficiency of each 150, 11.
6. More than one valve 131, 132 can be used in each path 104, 12.
7. One or both heaters 1, 2 can be in-line, i.e., having a linear inlet/outlet path.
8. One or both heaters 1, 2 can be radial (toroid-like), where the input air 120, 13 enters either the inner or outer area of the toroid and exits the opposite side.

The hybrid RF/conventional dryer 10 uses several electronic and RF measurements to determine realtime load 9 status. Realtime RF impedance measurements taken within the enclosure 10 help determine realtime load and medium status, including moisture. This impedance vs. time empirical data can be stored in a data file to help manage the drying process. In addition, the power level vs. time of both the RF source 2 and conventional source 1 can be measured and stored in this data file.

These parameters can be combined to calculate, for each heating period:
1. Load 9 initial moisture weight, from RF impedance.
2. Load 9 moisture density for RF impedance change versus total drying energy applied (usually measured in kWh).
3. Realtime load 9 moisture weight, from RF impedance.
4. Realtime load 9 moisture density, from rate of RF impedance change versus rate (in watts/second) of total drying energy applied.

The drying process is then realtime managed to specific user goals, such as drying speed, energy efficiency, wrinkle reduction, minimization of fabric 9 shrinkage, and minimization of fabric 9 mass loss (lint generation).

In some embodiments, estimates of realtime energy (based upon line voltage samples) are used to trigger when to transition from hot air drying to ambient air drying. This technique can reduce the time needed to dry the load 9. In an embodiment, the drying period is broken into three phases: RF heating 2, conventional heating 1, and ambient air drying. Decisions as to when to transition from one phase to another can be based upon several inputs, including one or more of the following: estimates of power, time, energy, temperature at the input to drum 10, temperature at the output to drum 10, realtime RF sensing, and empirical data from previous RF measurements.

The above discussion has set forth the operation of various exemplary systems and methods. In various embodiments, one or more steps of a method of implementation can be carried out by a processor under the control of computer-readable and computer-executable instructions. In some embodiments, these methods are implemented via a computer contained in, or otherwise associated with, system controller 4. The computer-readable and computer-executable instructions may reside on one or more computer useable/readable media, such as one or more hard disks, optical disks, and/or flash memories.

Therefore, one or more operations of various embodiments may be controlled or implemented using computer-executable instructions, such as program modules, being executed by the computer. Generally, "program modules" include routines, programs, objects, components, data structures, etc., that perform particular tasks or implement particular abstract data types. The program modules can be implemented in any combination of hardware, firmware, and/or software. The present invention may also be practiced in distributed computing environments where tasks are performed by remote processing devices that are linked through a communications network. In a distributed computing environment, program modules may be located in both local and remote computer-storage media, including memory-storage devices.

Although specific steps of exemplary methods of implementation are disclosed herein, these steps are examples of steps that may be performed in accordance with various exemplary embodiments. Embodiments disclosed herein are well suited to performing various other steps or variations of the steps recited. Moreover, the steps disclosed herein may be performed in an order different than presented above, and not all of the steps are necessarily performed in a particular embodiment.

Although various electronic and software based systems are discussed herein, these systems are merely examples of environments that might be utilized, and are not intended to suggest any limitation as to the scope of use or functionality of the present invention. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

The above description is included to illustrate the operation of preferred embodiments, and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. An apparatus for heating a load including an absorbed medium, comprising:
   a conventional energy source configured to heat air and to supply the heated air into an enclosure that accommodates the load and medium therein;
   a first air valve configured to, based on the conventional energy source being turned on, be opened to allow air heated by the conventional energy source to be supplied to the enclosure;
   an RF energy source configured to apply heat to the load and medium within the enclosure via an AC electrical field embodied as a capacitor; and
   a second air valve configured to, based on the RF energy source being turned on to perform RF dielectric heating of the enclosure, be opened to allow air heated by recovered heat from the RF energy source to be supplied to the enclosure.

2. The apparatus of claim 1, further comprising:
   a heat recovery plenum configured to absorb heat from the RF energy source; and
   coupled to the heat recovery plenum, means for imparting heated air from proximate the heat recovery plenum into the enclosure.

3. The apparatus of claim 1, wherein the load comprises clothes to be dried.

4. The apparatus of claim 1, wherein the RF energy source is a solid state RF signal generator configured to operate at a single frequency.

5. The apparatus of claim 4, wherein the single frequency is within a frequency range between 1 MHz and 50 MHz.

6. The apparatus of claim 1, wherein the apparatus is controlled by taking realtime RF impedance measurements to determine load and medium status including moisture level, and by controlling parameters of the RF energy source and the conventional energy source in realtime based upon the realtime RF impedance measurements.

7. The apparatus of claim 1, wherein a power level of at least one of the conventional energy source or the RF energy source is varied during a heating period.

8. The apparatus of claim 7, wherein the power level is varied by turning at least one of the conventional energy source or the RF energy source off.

9. The apparatus of claim 1, wherein air is forced to flow through the enclosure using a blower, and a rate of air flow through the enclosure is varied by controlling speed of the blower.

10. The apparatus of claim 1, wherein a heating period is broken into discrete phases, and each phase comprises activating at least one of the conventional energy source or the RF energy source.

11. The apparatus of claim 1, wherein air flow through the enclosure is used to recover heat produced by temperature increases in at least one of the load, medium, and RF power source.

12. The apparatus of claim 1, wherein:
    the enclosure is configured to rotate during at least a portion of a heating period;
    the heating period is broken into phases; and
    each phase comprises at least one of a different speed or a direction to a rotation of the enclosure.

13. The apparatus of claim 1, wherein the air heated by the recovered heat from the RF energy source is applied to the load and medium within the enclosure.

14. The apparatus of claim 13, wherein:
    heated air from the conventional energy source and recovered heated air from the RF energy source are each sent to the enclosure via a dedicated air channel; and
    air flow within at least one air channel is regulated.

15. The apparatus of claim 14, wherein the air flow within at least one air channel is regulated by opening or closing a valve situated within each air channel.

16. The apparatus of claim 14, wherein a heating period is broken into phases, and each phase comprises forcing a different rate of air flow through two dedicated air channels.

17. The apparatus of claim 1, wherein a duration and other parameters of a heating period are controlled by a preselected algorithm based upon desired results, wherein the desired results include at least one of speed, efficiency, and degree of care to be accorded to the load.

18. The apparatus of claim 17, wherein the other parameters include at least one of power levels of each of the conventional energy source or the RF energy source, flow of heated air from the conventional energy source, and flow of recovered heated air from the RF energy source.

19. The apparatus of claim 1, wherein the apparatus is controlled based upon at least one of estimates of power, time, energy, temperature at an input to a drum, temperature at an output to the drum, realtime RF sensing, or empirical data from previous RF measurements.

20. The apparatus of claim 1, wherein the RF energy source is configured to:
  perform the dielectric heating of the enclosure by applying an RF waveform to the medium absorbed in the load to thereby vaporize the medium; and
  discharge heat to an outside of the enclosure during the performance of the dielectric heating, and
  wherein the recovered heat from the RF energy source includes at least a portion of the heat discharged from the RF energy source during the performance of the dielectric heating.

\* \* \* \* \*